Aug. 5, 1969  G. CARTIER  3,459,982

ELECTRIC MOTOR HAVING CLAW TOOTH TYPE STATOR

Filed April 11, 1967

INVENTOR:-
Gaston Cartier
By Alexander Howell
Attorney

United States Patent Office 3,459,982
Patented Aug. 5, 1969

3,459,982
ELECTRIC MOTOR HAVING CLAW TOOTH
TYPE STATOR
Gaston Cartier, 8 Ave. de la Liberation,
Cluses, Haute-Savoie, France
Filed Apr. 11, 1967, Ser. No. 630,054
Claims priority, application France, Apr. 18, 1966,
47,177
Int. Cl. H02k 23/40, 5/14
U.S. Cl. 310—164                1 Claim

ABSTRACT OF THE DISCLOSURE

An electric motor having a rotor within a claw tooth type stator. The stator includes two star shaped poles, each of which is provided with an outwardly extending arm. A winding arrangement is positioned between the flat portions of said poles. Said rotor is provided with a disk-like commutator. A cap member closes the open end portion of said stator. The cap member supports the brush units arranged to communicate with the commutator, and a housing unit encloses the above mentioned elements therein.

---

In the specification of patent application No. 515,040, now U.S. Patent 3,065,141 there is described a new process for the manufacture of electric motors, principally with a view to reducing the axial dimensions of the motor to a minimum, and the invention claimed in that application includes motors made by this process.

According to that specification, the stator of the motor was formed by two pole pieces B and C situated one on each side of a permanent magnet of a flat annular shape.

The present invention relates to improvements made with a view to obtaining special performances with an electric motor of the kind described in the said patent application.

The process which is the object of the present invention consists of manufacturing an electric motor as described in the previous patent application No. 515,040, now U.S. Patent 3,065,141, with this difference, that the permanent magnet is replaced by a winding of conducting wires having at least one entry terminal and one exit terminal.

The invention equally includes all electric motors obtained by the carrying out of the aforementioned process.

Figure 1:
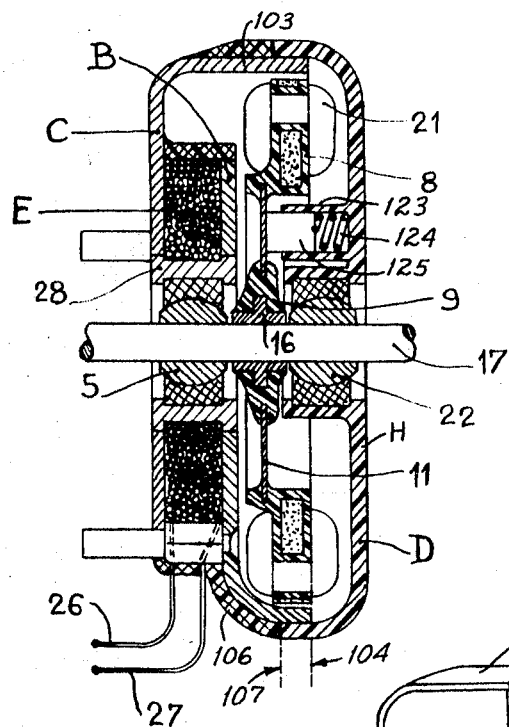
Figure 2:
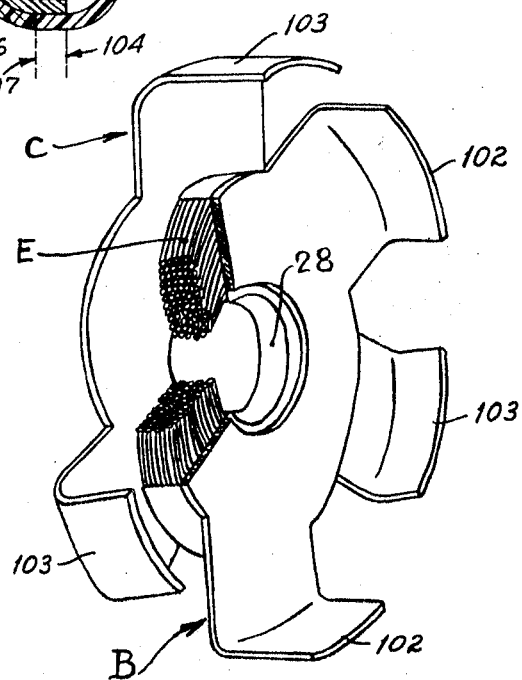

One construction in accordance with the present invention will now be described by way of example only, with reference to the accompanying drawings, in which:

FIGURE 1 is an axial section through an electric motor according to the invention, and FIGURE 2 is a view in prespective, partly in section of the stator pole-pieces and of their energising winding.

The components corresponding to those of patent application No. 515,040, now U.S. Patent 3,065,141, have been given the same reference numbers and letters.

The electric motor shown in FIGURE 1 comprises, as in the earlier patent, a rotor 16, 9, 11, 8, 21 fixed on to a shaft 17. The latter turns in self-centering bearings 5 and 22 carried by the stator and its cover D.

As in the earlier patent the stator comprises two pole pieces B and C made from sheet metal, but instead of these latter being placed one on each side of a permanent magnet, they are arranged at the opposite ends of a flat annular winding E obtained by coiling an electric conductor wire of which the ends constitute two terminals, entry and exit, 26 and 27 respectively.

The stator winding E may be manufactured by any known method, for example by coiling a wire of which the insulation consists of a layer of enamel. A metallic hub 28 is fitted.

It will be understood that the supply of current to the winding E will create in the centre of the latter a magnetic field lying in the direction of the shaft 17, and able to polarize the parts B and C in the same way as the permanent magnet described in the previous patent application. Nevertheless, contrary to what is obtained with a permanent magnet, and according to a known principle, the intensity of the magnetic field may be varied at will by suitably modifying the strength of the current which is passed between the terminals 26 and 27 of the stator winding E.

It must moreover be understood that the preceding description has been given only by way of example and that it in no way limits the scope of the invention which will not be exceeded by replacing the described constructional details by any other equivalents.

As disclosed in my aforementioned application Ser. No. 515,040 (FIGS. 6–10) now U.S. Patent 3,065,141, the rotor shroud 106 is limited at a transverse plane 107 which is situated slight behind the terminal plane 104 of the poles 102 and 103. Owing to this arrangement the projecting portions of the poles 102 and 103 will then serve to centre a plastic cover H which caps the stator E, B, C after the rotor is fitted.

The cover H which completes the stator of the electric motor is made of plastic injected around ball and socket bearing 22 of conventional type. This cover includes in particular the cylindrical sleeves 123 pointing axially towards the interior, in each of which a compression spring 124 is placed to hold a carbon or similar brush 125 against the commutator 11.

It will be seen that one of the important characteristics of the motor according to the invention consists of using brushes 125 which are pressed in an axial direction against a cummutator 11 arranged in a transverse plane. This arrangement notably allows the brushes 125 and the greater part of the sleeves 123 to be between the rim 8 and the windings 21 of the rotor, which notably reduces the overall length of the motor assembly, as appears clearly in FIGURE 1.

I claim:
1. An electric motor having a claw tooth type stator; a rotor; a flat commutator carried on said rotor; brushes sliding on said commutator; said stator comprising two sheet metal pole pieces each formed in a star shape with the arms thereof projecting from a central flat portion, and a flat annular wire winding between said flat portions for said stator pole pieces, the ends of which constitute entry and exit terminals respectively for said winding; said winding being axially displaced from but coaxial with said rotor; an open-ended plastic moulded shell housing said stator; said shell having a bearing for said rotor; a cap member adapted to close the open end of said shell and having a second bearing for said rotor; a metal shell housing said pole pieces; and said open ended plastic shell being fixedly united to and around said metal shell and said pole pieces.

References Cited
UNITED STATES PATENTS 3,093,763    6/1963    Sargeant            310—268
3,205,383    9/1965    Hurst               310—257

FOREIGN PATENTS 950,698    10/1949    France.

WARREN E. RAY, Primary Examiner

R. SKUDY, Assistant Examiner

U.S. Cl. X.R.
310—43, 257, 268